April 29, 1958  L. H. REES  2,832,573
HOMOGENIZER VALVE MEANS
Filed Oct. 22, 1954
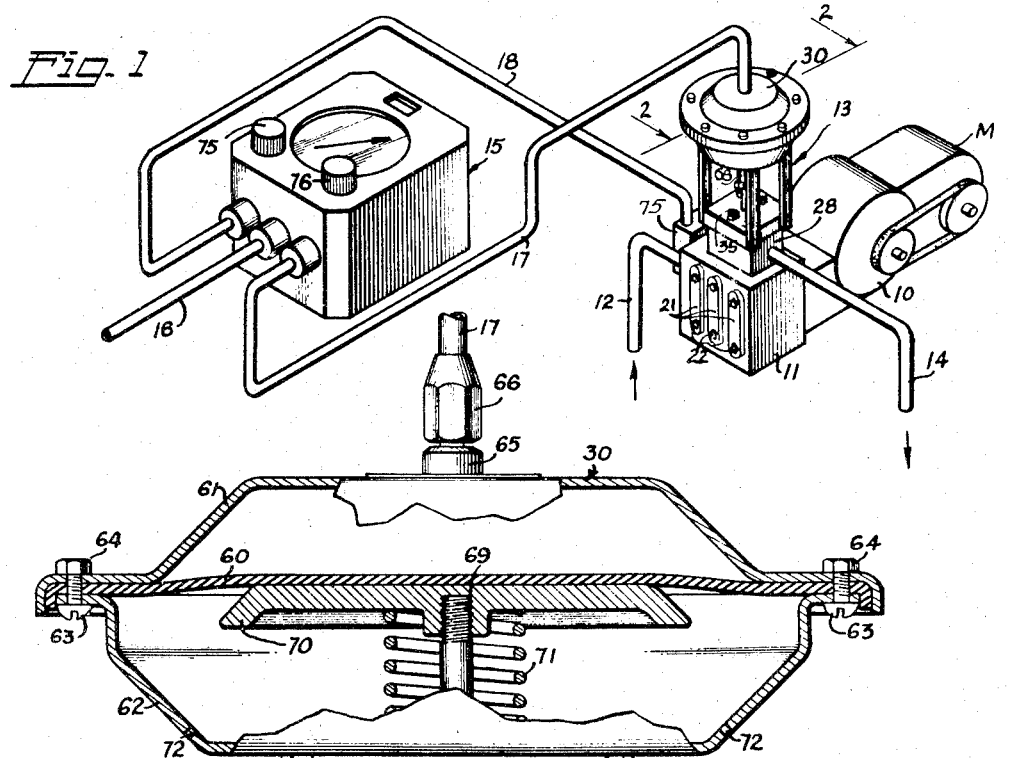
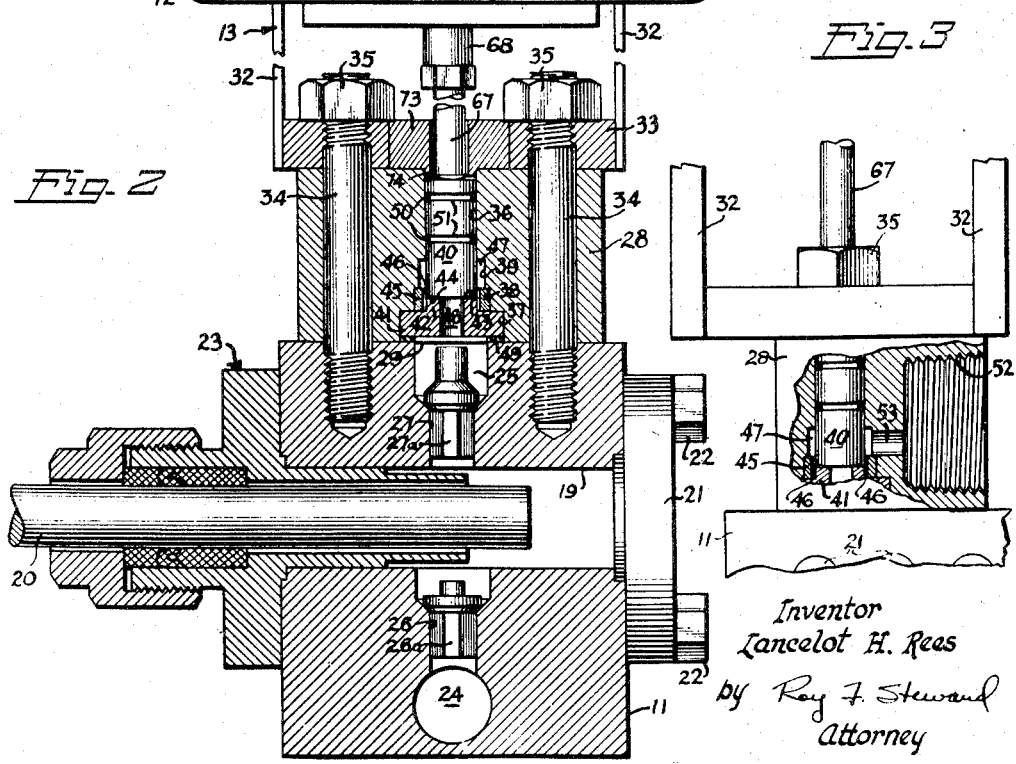
Inventor
Lancelot H. Rees
by Ray F. Steward
Attorney

United States Patent Office 2,832,573
Patented Apr. 29, 1958

2,832,573

HOMOGENIZER VALVE MEANS

Lancelot H. Rees, Westwood, Mass., assignor to Manton-Gaulin Manufacturing Company, Inc., Everett, Mass., a corporation of Massachusetts Application October 22, 1954, Serial No. 464,103

5 Claims. (Cl. 259—4)

This invention relates to pressure homogenization of liquids, and more particularly to means for effecting such homogenization under extremely accurately and uniformly controlled conditions.

It is an object of this invention to provide a pressure homogenizing valve in which relatively small but quite rapid changes in the valve adjustment may be effected, whereby the liquid or liquid-like material undergoing treatment may be subjected to exceptionally uniform processing. In speaking of liquids, the term is here used to refer to any material which will flow or can be pumped, ranging all the way from very low viscosity water-like liquids to highly viscous semisolids or pastes. It should also be mentioned that the use of the term "pressure homogenization" herein is restricted to mean the technical process by which a liquid is forced under positive pressure of a substantial order, that is, at least on the order of several hundred pounds per square inch as a minimum, through a valve passage within which is disposed a variable position valve member or restricter. The latter is provided with a surface which cooperates with an adjacent surface formed by a seat in the valve passage, and biasing means is employed to urge the valve member against its seat, from which it is displaced by the liquid material delivered under pressure by a high pressure pump. The two surfaces are thus held in closely spaced relation during the homogenizing process so that the liquid material is forced through the very narrow passageway thus defined. Depending somewhat on the nature of the product being homogenized and the homogenizing pressure, such displacement of the adjacent surfaces is conventionally restricted to a few thousandths of an inch. Because of the pressures employed in forcing the liquid through this narrow passageway, liquid velocities become extremely high at this point and a shearing action is imparted to the material which breaks up the clumps or agglomerates present and produces a uniform product. Still further homogenization of the material is obtained by causing it, while still at high velocity, to strike a target or "breaker" wall immediately upon emerging from between the closely spaced surfaces of the valve seat and valve member. The impact thus produced in causing the abrupt change of direction of fluid flow also aids materially in effecting the type of homogenizing to which this invention relates.

It has long been considered desirable to maintain a relatively uniform pressure in the liquid at the point of treatment, that is, at the aforesaid narrow passageway defined by the valve seat and its cooperating valve member. It has accordingly been customary in practically all commercial pressure homogenizers to employ some kind of a spring, such as a coil spring, to bias the valve towards its closed position. Since the desired operating pressures are high, ranging from the minimum pressures mentioned above to those on the order of 5000 pounds per square inch, and even more in certain instances, such springs must be quite heavy and stiff, even for valves of relatively small cross sectional area. As a result, such springs necessarily have a large amount of inertia and are incapable of quickly repositioning the valve member with fluctuations in homogenizing pressure. Such fluctuations can and do occur owing to the presence of small particles of foreign matter, or even of agglomerates of the material being treated, which tend to lodge temporarily between the valve surfaces and either plug the passage or hold the valve member too far off its seat. Then too, there are pressure pulses of a very transitory nature resulting from the reciprocating action of the pump plungers used to deliver the liquid to the valve. Since the pressure of course determines the velocity of the liquid as it passes through the valve, uniformity of treatment of the liquid is a direct function of this velocity.

Manual as well as automatic means for controlling the amount of biasing spring pressure have been provided heretofore, and while it is thus possible to adjust the valve to take care of slow pressure changes or surges, such constructions have not been able to effect the rapid re-adjustment of the valve necessary to smooth out the surges mentioned above. It has also been proposed in some instances heretofore to employ hydraulic or pneumatic biasing means, but all of such proposals have, so far as is known, been characterized by sluggish operation owing to the relatively high inertia of the arrangements proposed.

It is accordingly an object of this invention to provide a pressure homogenizer valve construction in which the means employed for biasing the variable position valve member has such low inertia as to permit rapid repositioning of that member and thus effectively eliminate pressure pulses or surges of even short duration.

The present invention further contemplates the provision of automatic control means for effecting the very rapid repositioning of the variable position valve member of the homogenizing valve in accordance with a condition of the material undergoing treatment, such as its pressure or its viscosity, for example. And such control means is further utilized to indicate excessive wear of the valve components, whereby it is possible to determine without disassembling the homogenizing apparatus when these components must be replaced.

These and other objects and improvements affored by the present invention will appear more clearly from the following description of a specific valve and control system illustrative of the invention. Various modifications in the valve and control system here described will be apparent and the invention is not limited to these specific details but is to be construed as broadly as the appended claims and the prior art permit.

In the drawings:

Fig. 1 is a diagrammatic representation of a homogenizer system embodying the invention, including a pressure homogenizer valve and automatic control and indicator means therefor;

Fig. 2 is a cross-sectional view in side elevation on line 2—2 of Fig. 1, partly in section and on an enlarged scale, of the homogenizer valve and a portion of the high pressure pump for supplying the liquid material to the valve; and Fig. 3 is a fragmentary view of the front of the valve shown in Fig. 2 (i. e. as viewed from the right in that figure).

The system illustrated diagrammatically in Fig. 1 comprises a pump 10, which in this instance is of the triplex type having a driving motor M. The pump has a main cylinder block 11 to which the liquid to be homogenized is supplied by an intake pipe 12, and has disposed on top of the cylinder block a pressure homogenizer valve assembly 13. An outlet or discharge line 14 leads from the homogenizer valve assembly for conducting the homogenized liquid away.

The system also includes a pressure controller-indicator 15 which may be adjusted to automatically govern the operation of the homogenizer valve, as more particularly described hereinafter. This controller is of the pneumatic type and is provided with an input air supply line 16 which delivers air at constant pressure from a source of supply, not shown, to the controller. The latter is likewise provided with a variable or controlled air pressure line 17 leading to the homogenizer valve assembly 13, and with a high pressure liquid conduit 18 which transmits homogenizer pressure to the controller.

As shown more especially in Fig. 2, the pump block 11 is bored horizontally to provide cylinders 19 (only one of these being shown in Fig. 2) within which pistons 20 are disposed for horizontal reciprocation. Each cylinder 19 is closed at one end by a cap 21 secured to the face of the cylinder block by bolts 22. At the opposite face of the block there are provided stuffing box assemblies indicated generally at 23, within which the forward ends of the pistons are carried. Reciprocation of the pistons is effected by means of a crank assembly (not shown) driven by motor M.

Cylinder block 11 is likewise provided with intake and discharge chambers 24, 25, respectively, which run longitudinally of the block, i. e. transversely of the cylinders. These passages communicate with the interior of cylinders 19 through passages 26 and 27, respectively. An intake check valve 26a is disposed in passage 26 and a similar discharge check valve 27a is carried in passage 27. Thus it will be apparent that on withdrawal of the piston 20, liquid will be sucked in from the intake chamber 24 past the check valve 26, and upon the return or pressure stroke of the piston, check valve 26a will close off and the liquid will be forced past discharge check valve 27a into the discharge chamber 25. From there, the liquid passes to the homogenizer valve body 28.

The homogenizer valve assembly 13 (Figs. 2 and 3) comprises the aforesaid homogenizer valve body 28 and a pneumatic piston or air motor 30 supported above the valve body by upright legs 32 extending upwardly from a base plate 33. The air motor and homogenizer valve body are secured in position on the cylinder block 11 by means of studs 34 threaded at their lower ends into the cylinder block and passing up through the valve body 28 and base plate 33. Nuts 35 are threaded on the upper ends of the studs to hold the components securely together in pressure tight relation.

The valve body 28 is provided with a vertical bore 36 extending through it, the lower half of the bore, as shown best in Fig. 2, being enlarged by a series of inwardly stepped, concentric counterbores 37, 38 and 39. A variable position valve member or plunger 40 is disposed in bore 36 for axial reciprocation therein, the lower portion of the plunger extending downwardly into the enlarged chamber formed by the recesses or counterbores for cooperation with a replaceable annular valve seat 41. The plunger is thus disposed on the downstream side of the valve seat and is normally free to be moved out of seating engagement by the flow of liquid through the valve. Valve seat 41 is press fitted into peripheral engagement with the wall of recess 37, and is provided with an upstanding collar or boss 42 against whose upper surface 43 the under surface 44 of plunger 40 is adapted to abut. Homogenization is effected when the liquid is forced between these surfaces. In the annular space closely surrounding the collar 42 there is placed a breaker or impact ring 45 which also closely surrounds the lower end of plunger 40. This provides a relatively narrow annular passageway 46 through which liquid may pass up to the larger annular chamber 47 formed by the recess 39 and plunger 40. The impact of the liquid, upon striking the impact ring and turning abruptly on emerging from between surfaces 43, 44, as has been previously mentioned, produces further homogenizing action. It will be noted that valve seat 41 has an axial bore or orifice 48 which is in substantially vertical alignment with the port 29 leading from the discharge chamber 25 in the cylinder block 11. The liquid thus passes up through the orifice in the valve seat to the under surface 44 of plunger 40, and between that surface and the mating surface 43 of valve seat 41, upon upward displacement of the plunger 40. A gasket 49 is compressed between the upper surface of the cylinder block 11 and the under face of the valve seat 41 to maintain a tight seal at the parting line between the cylinder block and valve body. Plunger 40 is likewise provided with seals, those illustrated being O-rings 50 disposed in peripheral grooves 51 in the plunger body. As shown more particularly in Fig. 3, the valve body 24 is provided with a threaded socket 52 for the reception of the discharge line 14, communication between this socket and the annular chamber 47 being provided by a passage 53.

To develop the high pressure necessary for homogenization, plunger 40 is resiliently held against its seat 41 by biasing means which, in the specific example shown in the drawings, comprises the air motor 30. Complementary dished shells 61, 62, of generally circular section form a chamber which is divided horizontally by a flexible diaphragm 60 of reinforced molded rubber or the like providing a pneumatic piston. The lower shell 62 is provided with upstanding legs 32 by which it is supported above the base plate 33 as mentioned above. The two halves 61, 62, of the housing are secured together peripherally and the flexible diaphragm 60 is clamped between the opposed peripheral flanges of the shells by screws 63 and nuts 64 at spaced intervals around the housing. Air is admitted through a nipple 65 having threaded engagement with a coupling nut 66 by which the supply line 17 is connected to the motor. In the lower half of the housing, a plunger actuating rod 67 is guided for axially reciprocable movement substantially perpendicular to diaphragm 60 in a guide bearing 68 secured in the shell 62. The rod 67 extends into the interior of shell 62 and is threaded at its upper end into a socket 69 in an inverted dish or plate member 70 underlying the central portion of the diaphragm. Plate 70 is normally urged into engagement with diaphragm 60 by means of a very light coil spring 71 held in compression between the under surface of the plate and the opposed inner surface of the shell. The tension of spring 71 is sufficient merely to return the valve rod to a retracted position by flexing the diaphragm 60 upward slightly when the controlled air pressure on the upper side of the diaphragm is relieved, but is otherwise without appreciable effect on the positioning of the diaphragm. It is also to be noted that lower shell 62 is vented to atmosphere by one or more apertures 72 to permit free movemenmt of the diaphragm within the lower half of the shell.

At its lower end, actuator rod 67 passes through a guide bushing 73, which is inset into the base plate 33 of the air motor, and has a boss 74 which fits down into the bore 36 in valve body 28. The lower tip of rod 67 passes through this bushing into contact with the upper surface of plunger 40 to impart the biasing pressure upon that member.

It will be apparent that since the surface area of the under surface 44 of plunger 40 is relatively small as compared with the area of diaphragm 60, a low pressure within the air chamber formed by shell 61 and diaphragm 60 will suffice to impart sufficient biasing force to plunger 40 such that the pump pressure to which the liquid is subjected may be very large before upward displacement of the plunger 40 can take place. Air pressures on the order of twenty to twenty-five pounds per square inch are normally ample for this. The air motor is therefore in effect an amplifier by which a small control pressure can be applied to regulate a relatively high liquid pressure in the homogenizer valve. Moreover the air motor arrangement provides an extremely sensitive control by which the homogenizing pressure can be accurately and closely regulated.

Regulation of the controlled air pressure delivered to the air motor by supply line 17 is effected by the pressure controller-indicator 15 as previously mentioned. Such controllers are of well known make and accordingly are not described in any detail here. For purposes of understanding the operation of the homogenizer valve of this invention, it need only be said that the controller is provided with a source of constant pressure air through supply line 16, and delivers variable pressure controlled air through pressure line 17 to the upper side of diaphragm 60. The controller 15 is provided with pressure and sensitivity selector control knobs 75, 76, by which it is possible to select any desired operating pressure in the homogenizer valve and to adjust the reset speed or ratio so as to maintain such pressure automatically. In order to do this, the controller is provided with a high pressure conduit or pipe 18 which connects into the usual gauge block 75 on the cylinder block 11 in place of the conventional pressure indicator. This gauge block is bolted to the rear face of the cylinder block and has a passage which communicates with the discharge chamber 25 of the cylinder block. Controllers of this type are manufactured by the Taylor Instruments Company, Rochester, N. Y., under the trade name "Fulscope," as well as by other instrument manfacturers, for example, Brown Instruments Company of Philadelphia.

Owing to the simplicity and small size of the necessary working parts of the novel homogenizer valve arrangement here shown, there is substantially no inertia in the control components, with the result that extremely rapid variation in control pressures are converted substantially instantaneously into a repositioning of plunger 40 whereby remarkably uniform pressure and hence constant velocity of the fluid undergoing treatment can be maintained. With the use of the biasing arrangement here disclosed, therefore, even such rapid pressure pulsations as are produced by the pistons of a positive displacement pump can be effectively dampened or eliminated.

For purposes of illustration, a typical operating condition will be described for the production of a starch size for use in textile slashers, the size used being pearl cornstarch in a concentration of about one pound to the gallon of solution. In operation, the homogenizer is started with the controller set in the zero pressure condition, thus allowing the homogenizing valve or plunger to open under substantially zero discharge pressure. As soon as the size begins to flow through the homogenizer, the controller is set to produce a pressure of, say, 1500 pounds per square inch. Assuming that the air motor has an effective diaphragm area of approximately 67 square inches and an approximate area on the face of plunger 40 of one-half square inch, supply air pressure at 20 to 30 pounds per square inch input to supply line 16 is sufficient. The selected homogenizing pressure is then set on the controller, and this will be established very rapidly, requiring only two or three seconds. At the start, the controlled air pressure in line 17 will approximate 9½ pounds per square inch to hold the 1500 pounds per square inch operating pressure at the homogenizer valve. Owing to thermal expansion of some of the valve parts, the initial controlled air pressure will vary somewhat but will average about 9 pounds per square inch after the operation has reached equilibrium condition. Of course this pressure will also vary somewhat owing to the occasional temporary lodging of small particles of material between the valve and seat, causing the controlled air pressure to rise in order to maintain desired homogenizing pressure. As soon as these materials flush themselves free, however, the controlled air pressure will again drop to the normal average. The operation is extremely rapid, being without appreciable time lag, and a recording of the homogenizing pressure on the recording indicator will show almost no variation in operating pressure.

In actual test, better than 50 percent improvement in the uniformity of the starch size results from the use of the system described. Prior to the use of this invention, the amount of size picked up by the warp threads ordinarily varied in commercial mills from 10 percent to 14 percent (of the weight of the warp) during a run. This variation is readily reduced to 11½ percent to 12½ percent by using the novel valve, and not only improves the quality of the product but reduces its expense.

It has further been found that the controlled air pressure supplied to the diaphragm 60 provides an indication of wear in the homogenizer valve. Thus, with a new valve and seat having unworn surfaces, there will be found to be a given controlled air pressure required to produce a certain homogenizing pressure. As the components wear, owing to the friction of the fluid, there is a decrease in the restriction offered to the passage of the fluid, which will result in a lower homogenizing pressure for the same setting of the valve. This will be evidenced by a gradual increase in controlled air pressure required to compensate for the valve wear in order to maintain the desired homogenizing pressure. It becomes unnecessary, therefore, in the system here described to disassemble the valve, as frequently must be done in prior systems, to inspect it for excessive year, as the controlled air pressure will tell at once when this condition has been reached.

Various modifications in the specifically illustrated system will be apparent from the foregoing. It will also be apparent that the automatic control of homogenizing pressure can be made dependent on conditions other than the pressure itself. For example, a recording viscometer can be placed in the discharge line from the homogenizer with the viscometer controlling the pressure delivered to the air motor in accordance with the viscosity of the resulting product. Since the viscosity of many materials can be controlled by the homogenizing pressure employed, this affords an extremely convenient way of obtaining a product of uniform viscosity.

What is claimed is:

1. In a pressure homogenizer valve for treating liquid materials, the combination which comprises a valve body having a passage therethrough, a valve seat in said passage and a valve member cooperating with said seat on the downstream side to restrict the flow of liquid through said passage, said valve member being normally free to be urged out of seating position by the liquid flow through said passage, means for so resiliently biasing said valve member against said seat as to maintain a constant rate of liquid flow through said valve, said means comprising a pneumatic piston operably connected to said valve member and positionable in response to a physical condition of the liquid undergoing treatment, the effective positioning of said valve member during processing of said liquid material being controlled by interaction between the pressure of the liquid undergoing treatment and said pneumatic piston means.

2. The combination as defined in claim 1, wherein said piston is positionable in response to the pressure of the liquid undergoing treatment.

3. In a pressure homogenizing system for the homogenization of a liquid material: a passage through which the material is forced under pressure; a variable position valve member cooperatively associated with said passage on the downstream side and so disposed as to be normally free to be urged out of flow restricting position by liquid flow therethrough; air-operated diaphragm means mechanically linked to said valve member, said diaphragm being operable upon introduction of air pressure thereto to resiliently force said member towards maximum flow-restricting position; master control means for controlling the action of said diaphragm, comprising pressure sensing means responsive to the pressure of the material being treated; a source of compressed air; communication between one side of said diaphragm and said compressed air source; and means actuated by said pressure-sensing means and disposed between said compressed air source and said diaphragm for controlling the admission of compressed air to said diaphragm whereby the velocity through said passage of the material undergoing treatment is maintained substantially constant at all times, the effective positioning of said valve member during processing of said liquid materials being controlled by interaction between the pressure of liquid undergoing treatment and said pneumatic piston means.

4. In a system for effecting uniform pressure homogenization of a liquid material: a pump for supplying the material under postive pressure; an homogenizer valve to which the material is supplied comprising a main body portion having a passage therethrough and a valve seat disposed therein, a variable position valve member adapted and arranged to coact with said valve seat at the downstream side and normally free to be moved out of seating engagement therewith by liquid flow through said valve, to provide a restricted orifice in said passage; an air motor connected to said valve member for resiliently biasing the latter against said seat, said motor including a diaphragm, a port in said motor for the introduction of compressed air to one side of said diaphragm to urge it against said seat, the other side of said diaphragm being vented to atmosphere; master control means for controlling said air motor; and a source of compressed air, said master control means being connected between said air source and said motor; said master control being responsive to the pressure of the liquid material being treated and controlling thereby the admission of compressed air to said air motor to maintain a constant velocity of said material through said valve.

5. The homogenizing system defined in claim 4, which further includes a recording indicator of the air pressure in said air motor, whereby the condition of wear of the homogenizer valve components is indicated externally of the valve.

References Cited in the file of this patent

UNITED STATES PATENTS

| | | |
|---|---|---|
| 387,851 | Braggins | Aug. 14, 1888 |
| 1,000,641 | Tebbit | Aug. 15, 1911 |
| 2,013,222 | Thomas | Sept. 3, 1935 |
| 2,496,215 | Jones | Jan. 31, 1950 |